(12) United States Patent
Knabenbauer

(10) Patent No.: US 7,006,056 B1
(45) Date of Patent: Feb. 28, 2006

(54) THREE-DIMENSIONAL DISPLAY APPARATUS

(75) Inventor: Daniel J. Knabenbauer, Reseda, CA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 09/477,570

(22) Filed: Jan. 6, 2000

(51) Int. Cl.
*G09G 5/00* (2006.01)

(52) U.S. Cl. ............................................. 345/6
(58) Field of Classification Search ............ 345/84, 345/32, 74.1, 75.2, 30, 6
See application file for complete search history.

(56) References Cited

U.S. PATENT DOCUMENTS

| | | | | | |
|---|---|---|---|---|---|
| 2,543,793 | A | * | 3/1951 | Marks | 313/149 |
| 3,555,349 | A | * | 1/1971 | Munz | 315/383 |
| 3,585,443 | A | * | 6/1971 | Krembs | 313/514 |
| 3,790,849 | A | * | 2/1974 | Mayer et al. | 345/71 |
| 4,134,104 | A | * | 1/1979 | Karras | 345/6 |
| 4,790,629 | A | * | 12/1988 | Rand | 345/32 |
| 5,128,660 | A | * | 7/1992 | DeMond et al. | 340/707 |
| 5,801,666 | A | | 9/1998 | MacFarlane | 345/6 |
| 5,986,409 | A | * | 11/1999 | Farnworth et al. | 315/169.4 |
| 6,023,315 | A | * | 2/2000 | Harrold et al. | 349/106 |
| 6,064,423 | A | | 5/2000 | Geng | 348/36 |
| 6,281,861 | B1 | * | 8/2001 | Harrold | 345/32 |
| 6,288,694 | B1 | * | 9/2001 | Jager et al. | 345/74.1 |
| 6,479,929 | B1 | * | 11/2002 | Knabenbauer | 313/484 |

OTHER PUBLICATIONS

Okada et al, Joint Geometry/ Texture Progressive Coding of 3D Models, 2000, IEEE.*
The Electrical Engineering Handbook, Second Edition; Dorf, Richard C.; pp. 1939-1950; 1997.

* cited by examiner

*Primary Examiner*—Xiao Wu
*Assistant Examiner*—Kevin M. Nguyen
(74) *Attorney, Agent, or Firm*—Duke W. Yee; Thomas E. Tyson; Stephen J. Walder, Jr.

(57) ABSTRACT

A three-dimensional display apparatus capable of producing an image in three dimensions without the aid of optical illusions or perspective trickery. The display apparatus is comprised of a plurality of pixels which are, in turn, comprised of a plurality of cells. The cells illuminate in one of the three primary colors red, green and blue such that a combination of a red, green and blue cell into a pixel, is capable of producing any color in the visible spectrum. The cells are oriented in the pixel such that light from the pixel is perceivable in six directions, thereby creating a three-dimensional light source. By combining a plurality of these three-dimensional light sources, i.e. a plurality of pixels in a three-dimensional matrix, a three-dimensional image is capable of being displayed.

45 Claims, 6 Drawing Sheets

THREE-DIMENSIONAL DISPLAY APPARATUS

BACKGROUND OF THE INVENTION

This application is related to co-pending and commonly assigned U.S. patent application Ser. Nos. 09/477,568 and 09/477,571 filed concurrently herewith and hereby incorporated by reference.

1. Technical Field

The present invention is directed to a three-dimensional display apparatus. In particular, the present invention is directed to a display comprised of a plurality of pixels, each pixel being comprised of a plurality of cells, which is capable of displaying an image in three-dimensions.

2. Description of Related Art

The ability to accurately recreate images in three dimensions has long been sought after. Three-dimensional displays may be very important in such areas as entertainment, medical imagery, architectural design, and a plethora of other areas. The result of this long felt need for three-dimensional displays has been the development of advanced ways of tricking the human brain into believing that the images seen by the eye are in three dimensions.

For example, computers may use perspective drawing techniques to represent three dimensions on a two dimensional screen. Some pictures and optical illusions, when stared at, give the impression of some depth due to the brain's pattern recognition capabilities and the brain's desire to interpret what is seen in a meaningful way. "Virtual reality" goggles make use of doubling a two dimensional perspective image so that the brain interprets the perspective as depth. Other methods of tricking the brain, such as holography and 3D glasses, have been used with limited success.

Thus, the attempts at creating three-dimensional imagery have failed at creating an actual three-dimensional display and must therefore, rely on tricks to fool the human brain into believing what is seen is a three-dimensional image. In view of the above, it would be advantageous to have a method and apparatus to provide an actual three-dimensional image.

SUMMARY OF THE INVENTION

The present invention provides a three-dimensional display apparatus that does not require tricks or illusions to represent objects in three dimensions. The display is comprised of a plurality of pixels which are, in turn, comprised of a plurality of cells.

The cells include a plurality of cell walls, a cell lens wall and a cell base. The cells further include an anode and a cathode. The cell is filled with a gas that is excited by electrical discharges. A phosphorus material is applied to the anode, or nearby the anode, such that when an electrical discharge is created between the anode and the cathode, the gas is electrically excited causing the gas to emit ultraviolet radiation. The ultraviolet radiation causes the phosphorus material to emit visible light according to a color of the phosphorus material. An anode having a phosphorus material of a certain color applied to it or nearby it will be identified by the color of the phosphorus material. Thus, for example, an anode having a red colored phosphorus material applied to it will be identified as a red anode.

A plurality of cells are combined to create a pixel. Each pixel has at least one cathode and at least one anode of each color red, green and blue. By controlling the intensities and durations of the charge to each of the anodes of the respective colors red, green and blue, every color in the visible spectrum is producible. The pixel may further include a lens for helping to focus the visible light such that the light is perceivable by a viewer in six directions, thereby creating a three-dimensional light source.

A plurality of the pixels are combined to create a three-dimensional display. The three-dimensional display is controlled by a control system that determines which of the pixels to turn on and which to turn off, as well as the intensities of the light that the cells of the pixels produce and the duration of their illumination. Based on this determination, the control system sends electrical signals along addressable anode bus lines, cathode lines, and the like, to cause the selected pixels to illuminate. The combination of illuminated pixels, which are three-dimensional light sources, in a three-dimensional matrix creates a three-dimensional display. The three-dimensional display is an actual three-dimensional display and is not based on optical illusions or perspective trickery.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

DETAILED DESCRIPTION OF THE PREFERRED EMBODIMENT

The present invention is a hierarchy of devices which build upon each other. The three-dimensional display of the present invention is comprised of a plurality of pixels which are, in turn, comprised of a plurality of cells. Thus, the following description will address each of these building blocks from the cell to the display separately for clarity.

Three-Dimensional Display Cell

Figure 1:
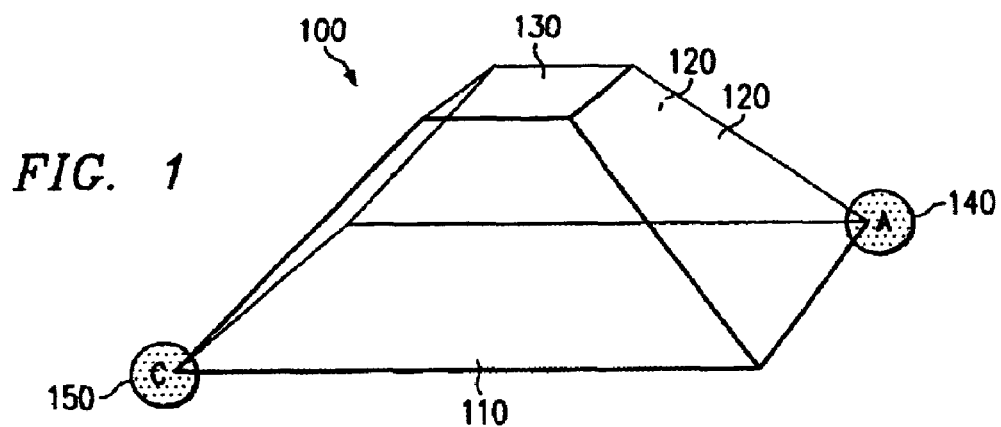
FIG. 1 is an exemplary diagram of a cell.

FIG. 1 is an exemplary diagram of a cell 100 according to the present invention. As shown in FIG. 1, cell 100 is comprised of a cell base 110, a plurality of cell walls 120, a cell lens wall 130, an addressable anode 140 and a cathode 150. Cell 100 has a truncated-pyramidal shape with the volume created by the cell base 110, cell walls 120 and cell lens wall 130. The volume is filled with a gas, such as Xenon gas, or the like, that emits ultra-violet radiation when electrically excited.

Although FIG. 1 shows the cell 100 as having a large height, the dimensions of the cell 100 in FIG. 1 are exaggerated for clarity of description of the elements 110–150. In a preferred embodiment, the height is less than one half the length or width of the cell base 110 in order to ensure that the cell 100 may be combined with other cells 100 to create a pixel. Furthermore, FIG. 1 shows the cell base 110, cell walls 120, and cell lens wall 130 as being without thickness while in actuality the cell base 110 and cell walls 120–130 will have a thickness due to the materials used in their construction.

The cell base 110 and cell lens wall 130 are constructed from a transparent material such that light emitted from the cell 100 may pass through the transparent material. The transparent material may be, for example, glass or the like. With the cell lens wall 130, light passing through the transparent material is reflected back through the cell lens wall 130 by a lens, described hereafter. With the cell base 110, the light passing through the transparent cell base 110 is emitted as visible light which is perceivable by the human eye.

Although the above described embodiment utilizes a cell lens wall 130 made of a transparent material, the invention is not limited to such an embodiment. Rather, the cell lens wall 130 may be the lens itself. Thus, the cell 100 may have an opening at the apex of the cell 100 which may be used to accommodate the placement of the lens. However, for purposes of describing the invention, it will we assumed that the cell lens wall 130 is a separate cell wall located at the apex of the cell 100.

The cell lens wall 130 may be flat as shown in FIG. 1 or may have various different shapes depending on the type and size of the lens used with the cell 100. For example, if a spherical lens is used, the cell lens wall 130 may have a curvature protruding into the cell 100 volume to thereby accommodate the curvature of the lens. Similarly, if a lens is omitted, a cell lens wall 130 is not needed, and the cell walls 120 may continue the pyramidal shape of the cell 100 to a pointed vertex where the lens would have been centered.

The cell base 110 and cell walls 120 are comprised of a dielectric material which is transparent to visible light and which reflects or absorbs ultraviolet light. This allows the visible light from a first cell 100 to blend with a second cell 100 while preventing the ultraviolet light from the first cell 100 from interfering with the operation of the second cell 100. For example, the cell walls 120 may be constructed from a glass material coated with an ultraviolet light blocker or absorption material (such as is currently used in the construction of sunglasses and prescription glasses). The coating is clear and does not affect the tint of the material.

The dielectric properties of the material of the cell base 110 and the cell walls 120 aid in containing the electric discharges within the cell. In this way, the electric discharges of one cell will not interfere with the operation of a neighboring cell when the cells are placed in a matrix formation.

The cell further includes a phosphorus material which is used to emit visible light when an electrical discharge is created between the addressable anode 140 and cathode 150. The phosphorus material may be placed near the addressable anode 140, such that the electrical discharge passes through the phosphorus material. Alternatively, the phosphorus material may be placed on one or more of the cell walls 120 or a portion of one or more of the cell walls 120 such that the electrical discharge does not pass through the phosphorus material.

By avoiding the electrical discharge passing through the phosphorus material, degradation of the phosphorus material is minimized. However, for purposes of clarity, the following description will assume the phosphorus material to be placed on or near the addressable anode 140. As such, anodes having a red colored phosphorus material applied to them or nearby them will be designated red anodes, with the same notation used in regard to blue and green phosphorus material.

The electrical circuitry necessary to cause the cell 100 to function may be placed in any location on the cell walls 120 or in the seams between the cell walls 120, the seams between the cell walls 120 and the cell lens wall 130 or the cell base 110, by using microchip technology. Such circuitry is readily apparent to those of ordinary skill in the art and may comprise fine wires, resistors, and the like, along with cathode electrical lines and an addressable anode bus line. The electrical connections are preferably transparent to the human eye such that they are not perceived when the cell 100 is viewed in a normal viewing manner.

The operation of the cell 100 is similar to that of cells in plasma displays, such as the plasma display described in *The Electrical Engineering Handbook*, Second Edition, CRC Press, 1997, pages 1939–1950, which is hereby incorporated by reference. Specifically, the addressable anode 140 is selectively positively charged when a signal is sent to the addressable anode 140 by way of an anode bus line (not shown). As a result, electrons from the cathode 130 are attracted to the addressable anode 140 thereby creating an electrical discharge and an excitation of the gas filled volume in a cell 100.

Because of the electrical excitation, the gas in the cell 100 emits ultraviolet radiation which causes the phosphorus material in the cell to emit visible light corresponding to the color of the phosphorus material. The visible light emitted by the phosphorus material is focused by the lens (if present) to pass through the cell base 110 such that the light is perceivable by the human eye.

The intensity and duration of the light emitted from the phosphorus material can be controlled by controlling the intensity and duration of the electrical discharge. Thus, by controlling the signal from the anode bus line to the addressable anode 140, the intensity and duration of the cell 100 emissions can be controlled.

The cell 100 emits visible light corresponding to the color of the phosphorus material in the cell 100. When a plurality of these cells 100 are combined, one cell 100 having, for example, a red phosphorus material, another having a green phosphorus material, and a third having a blue phosphorus material, by controlling the intensities of the light emitted from each of these cells 100, all of the colors in the visible spectrum may be produced. The combination of cells 100 is referred to herein as a pixel of the three-dimensional display.

Three-Dimensional Display Pixel

Figure 2A:
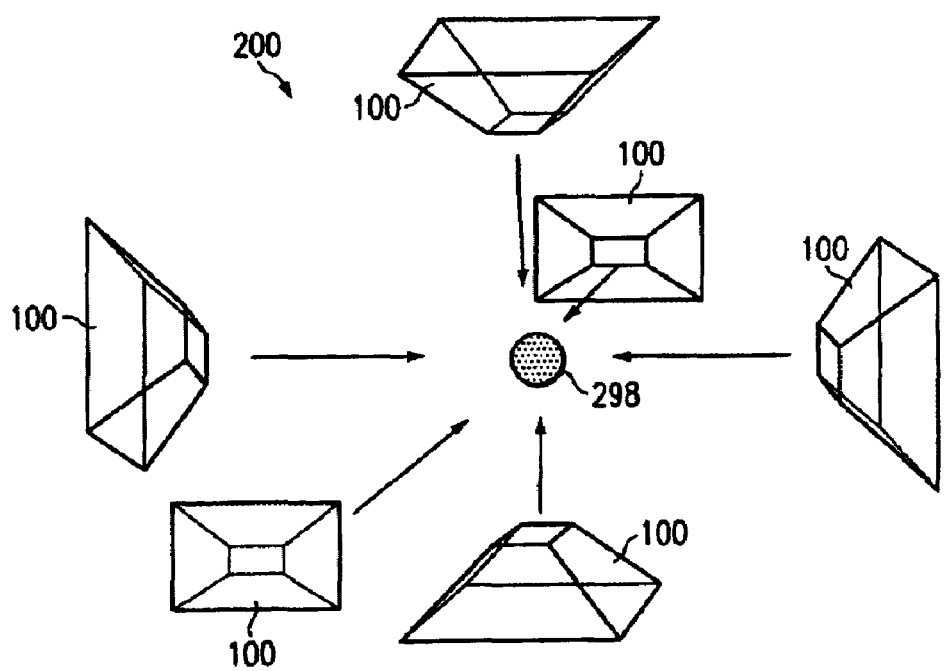
FIGS. 2A and 2B are exemplary diagrams of a pixel.
Figure 2B:
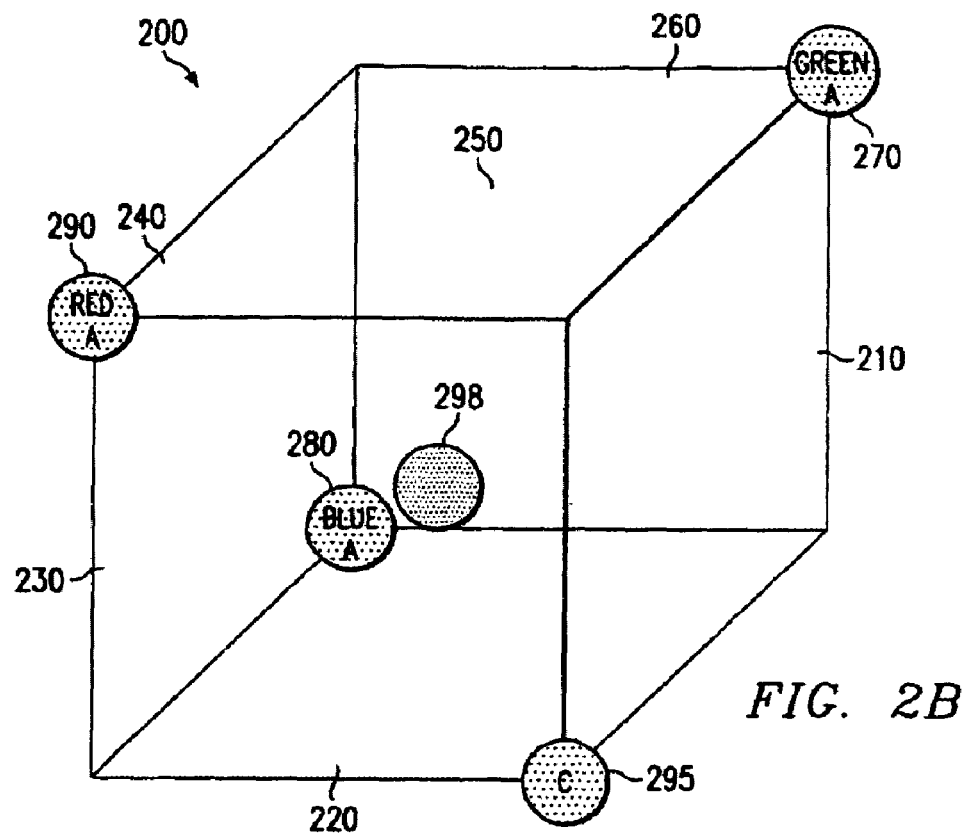

FIGS. 2A and 2B are exemplary diagrams of a pixel 200 according to the present invention. As shown in FIG. 2A, the pixel 200 is comprised of a plurality of cells 100 with each face of the cube being a cell base 110. For example, in the cube structure of FIG. 2A, six cells are combined to create the pixel 200 (one cell for each face of the cube).

Only three of the cells 100 are necessary for creating the visible light that will be emitted by the pixel 200 even though the light will be emitted in all six directions from the center of the pixel. Thus, for example, cells 210, 220 and 230 in FIG. 2B, corresponding to cells having a green phosphorus material, blue phosphor and red phosphorus material, respectively, are used to create any color in the visible spectrum. The auxiliary cells 240–260 may be used for auxiliary anodes, wiring, and other circuitry used to operate the pixel 200. Alternatively, the auxiliary cells 240–260 may be removed to provide further space for circuitry or to allow for larger cells 100 having a larger gas volume. However, a singular three-dimensional geometry should be maintained for all pixels 200 such as, for example, a cube.

Each of the cells 210–230 has a corresponding addressable anode 270–290. A single cathode 295 is used to power each of the cells 210–230. Thus, for example, when the cathode 295 is powered and the addressable anode 270 receives a signal, the cell 210 is caused to emit a green light. Similarly, when addressable anodes 280 and 290 receive signals, the cells 220 and 230 are caused to emit blue and red lights, respectively. The light from each of the cells 210–230 is combined to create a single pixel color that is seen by the human eye. Thus, by controlling which cells 210–230 illuminate and the intensities of each of the illuminations, various colors of the visible spectrum are perceived by a viewer.

Although a single cathode 295 is utilized with each of the cells 210–230, the invention is not limited to such an embodiment. Rather, depending on the implementation, each cell may have its own dedicated cathode 295. A single cathode 295 is preferred in this embodiment because it simplifies the overall design and reduces the amount of materials necessary to create the pixel 200. However, power constraints and potential problems with stray discharge may require that one or more of the cells 100 in a pixel 200 have their own cathode 295 or share their cathode 295 with a limited number of other cells 100.

The cells 210–260 are centered around a lens 298 which can focus the visible light emitted from the phosphorus material through the cell bases 110 (faces of the cube). The lens 298 may have, for example, a refractive core and utilize different thickness of materials for determining the focusing of the lens 298. For example, the lens 298 may have a crystalline substrate for a core that provides refractive qualities similar to diamonds. The light reflected from the crystalline core will be reflected at multiple different angles which intersect at several points thereby blending the colors of light together. The lens material surrounding the core may then map the outermost planes of the crystalline substrate to the plane of the pixel walls making the pixel walls appear brightest, thereby giving the pixel its cubical lighted shape.

The lens 298 may be spherical (as shown) or may be any other geometric configuration that allows for the focusing of light through each of the cells 210–260. For example, the lens 298 may be cubical or hexagonal in shape. The cell lens walls 130 for each of the cells 210–260 is shaped to accommodate the shape of the lens 298 or lack thereof.

Because the lens 298 focuses the light emitted by the phosphorus material onto the cell bases 130, i.e. the faces of the pixel, a three-dimensional light source is created. When a plurality of pixels are combined, each having a three-dimensional light source, the result is a three-dimensional image. The thickness of the cell bases 110, i.e. the faces of the cube, provide enough distance between the pixels 200 such that the colors of the pixels do not blend into one another and the pixels are distinguishable.

Three-Dimensional Display

Figure 3:
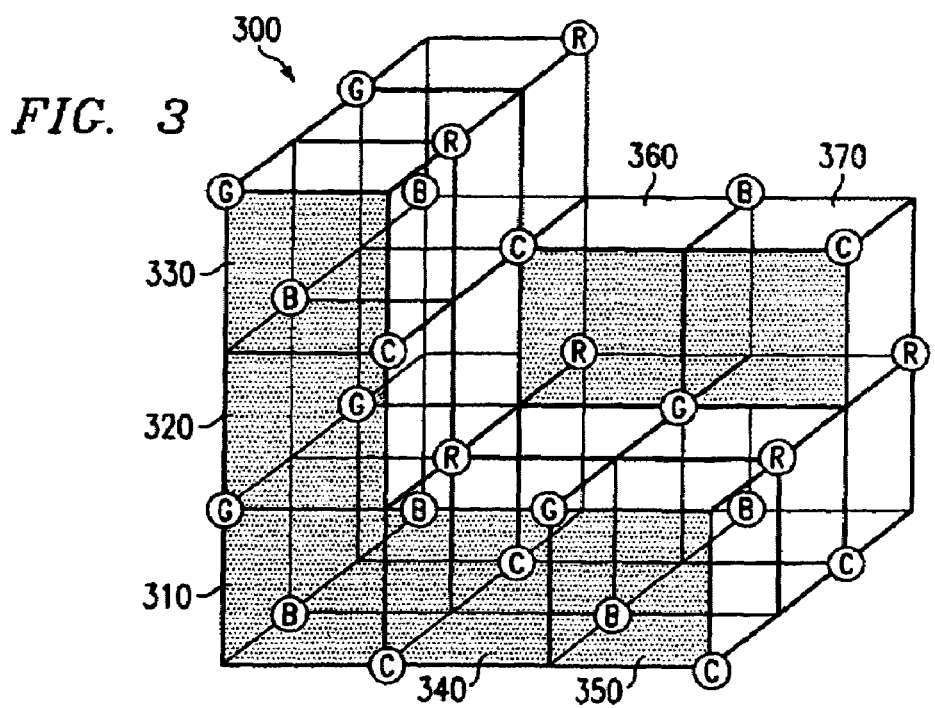
FIG. 3 is an exemplary diagram of a three-dimensional display section.

FIG. 3 is an exemplary diagram of a three-dimensional display 300 according to the present invention. As shown in FIG. 3, the display 300 is comprised of a plurality of pixels 310–370. These pixels are implemented using pixel 200 from FIG. 2. Each of the pixels 200 has a red, blue, and green anode (designated in FIG. 3 as a circle with an R, B or G) and a cathode (designated by a circle with a C). The front face of the pixels 310–370 are shaded for clarification purposes only and the actual display will not require additional shading of the pixel face.

Additionally, the cube structure of the display 300 is cut away in FIG. 3 to aid in understanding the structure of the display 300. In actuality, the display 300 may be a complete cube or may be any other geometric configuration. For example, the display 300 may be rectangular, rhomboidal, or the like. The lenses of the pixels are not shown in FIG. 3 for clarity in illustrating the invention.

As shown in FIG. 3, up to eight adjacent cells may share an anode and/or a cathode. Furthermore, pixels 310–370 may share pixel faces and hence, share the pixel face materials. For example, the top face of pixel 310 may also be the bottom face of pixel 320. This arrangement of pixels 310–370 minimizes the amount of materials necessary to produce the display 300, reduces the complexity of the overall display 300, and thereby reduces the cost of producing the display 300.

Microchip technology may be used to create connections between pixels, cells, signal sources and power sources along the seams between pixels 310–370 and/or in the cell walls or auxiliary cells. In particular, the seams between anodes may be used to hold an addressable anode bus line for addressing the anodes to thereby turn the cells of the pixels 310–370 on and off and to control the intensity and duration of the illumination of the pixels.

It should be noted that each addressable anode in the display 300 is connected to another addressable anode of the same color by a straight line bus connection along a seam in any direction. Thus, for example, the green anode of pixel 310 is connected by a bus line along the seam to the green anode of pixel 330. Likewise, the green anode of pixel 310 is also connected by a bus line along the seam to the green anode of pixel 340 and to the green anode of the pixel behind pixel 320. This structural characteristic aids in addressability of the pixels in that every pixel seam will have only one type of anode or cathode assigned to it.

It should also be noted that the distance between any two adjacent anodes and the distance between adjacent anodes and an adjacent cathode is the same. In other words, each primary electrical component is equidistant from its nearest neighbors in this invention's matrix of pixels. This distance, in the cubical structure shown in FIG. 3, is equal to the square root of two, times the length of one side of a pixel.

Furthermore, the distance between an electrical component (anode or cathode) and its nearest neighbor of the same type is twice the length of one side of a pixel. This configuration simplifies the calculation necessary to determine signal strength and the specific charges needed for a desired cell output.

Figure 4:
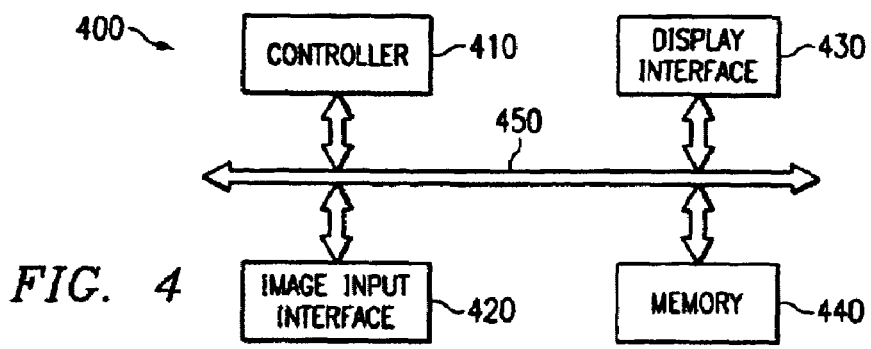
FIG. 4 is an exemplary block diagram of a control system for controlling the operation of the——three-dimensional display.

FIG. 4 is an exemplary block diagram of a control system 400 for controlling the operation of the three-dimensional display of FIG. 3. As shown in FIG. 4, the control system includes a controller 410, an image input interface 420, a display interface 430, and a memory 440. These elements are in communication with one another via the control/signal bus 450. Although a bus architecture is shown in FIG. 4, other architectures that facilitate the communication between elements 410–440 may be used without departing from the spirit and scope of the invention.

The controller 410 may be used to determine which pixels 200 of the display to illuminate, which anodes and/or cathodes to charge and the intensity of the charge to each of the anodes and/or cathodes in order to create a desired three-dimensional image input via the image input interface 420. Using the control system of FIG. 4, an image is input via the image input interface 420 and temporarily stored in memory 440. The image input interface 420 may provide a communication pathway from any of a plurality of image sources. For example, the image source may be a computer, television signal receiver, cable system receiver, satellite receiver, storage medium, or the like.

The input image may need to be coded in such a way that the input image data depicts an image in three dimensions. For example, in computer graphical displays, the input image data may consist of three-dimensionally rendered objects which have image data identifying image features with three-dimensional measurements.

The controller 410 pixelizes the input image in three dimensions and sends the pixelized input image to the display interface 430. The display interface 430 processes the pixelized input image and drives the three-dimensional display 300 to reproduce the image in three dimensions. The pixelization and reproduction of the input image may make use of coordinate system transformation to transform the pixelized input image into data represented in a display coordinate system. Such coordinate transformations are well known to those of ordinary skill in the art.

Figure 5A:
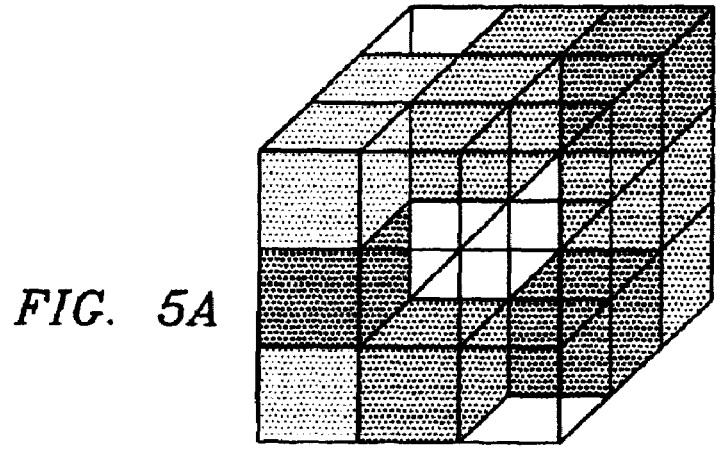
FIGS. 5A–C are exemplary diagrams of a three-dimensional image producible with the three-dimensional display apparatus according to the invention.
Figure 5B:
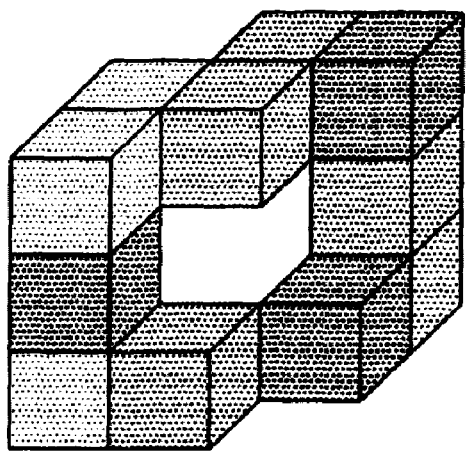
Figure 5C:
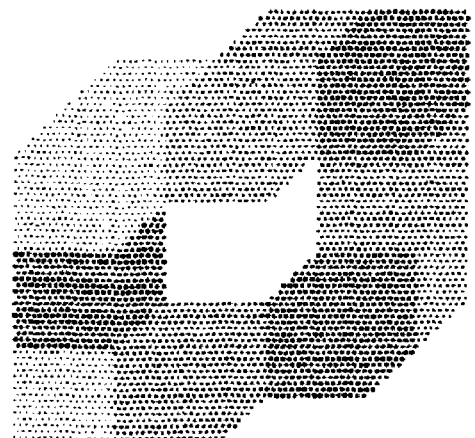

FIGS. 5A–C illustrate the manner in which the display 300 of FIG. 3 may be used to generate a three-dimensional image. As shown in FIG. 5, the controller 410 controls the pixels such that each pixel illuminates a desired color. Those pixels that are not to illuminate or those pixels that are not perceived by a viewer (such as pixels in the center of the display, are not "turned on" by the controller 410 and thus, do not illuminate.

FIG. 5A shows the display 300 (the full cubical display 300) with the non-illuminated pixels shown for correlation to the display 300 shown in FIG. 3. FIG. 5B shows the display 300 without the non-illuminated pixels but with pixel seams shown. FIG. 5C shows the display 300 as it would be seen from a human viewer. As shown in FIG. 5C, the human viewer does not perceive the pixel seams but rather only sees differences in color. Also note that pixel walls that are shared by two pixels and that are illuminated by both pixels will be internal to the three-dimensional image and will not be seen by the viewer.

As an example of the use of the display 300 to produce a three-dimensional image, consider a hollow cylinder, having a square cross-section, standing on one end. In order to display such an image with the display 300, the outer facing pixels of the display 300 will be illuminated while the center pixels will not be illuminated. Thus, if a viewer is to look at the display from a vantage point slightly above the display, the viewer will see a square shaped top with sides extending downward. Furthermore, some of the pixels from the side of the cylinder will be seen through the center hole in the cylinder since the center pixels are not illuminated. This in addition to the relative distance between illuminated pixels allows a viewer to perceive depths in the three-dimensional image.

Manufacture of the Three-Dimensional Display

Figure 6:
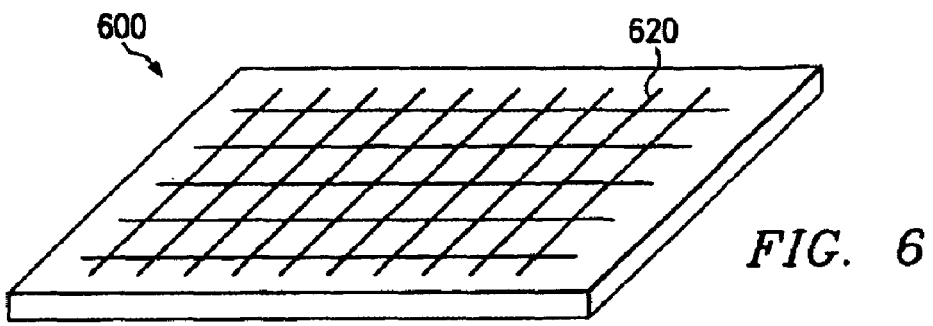
FIGS. 6–9 illustrate a method of manufacturing the three-dimensional display apparatus according to the invention.

FIGS. 6–9 depict a manufacturing process for manufacturing a three-dimensional display apparatus according to the invention. As shown in FIG. 6, the first step in manufacturing the three-dimensional display of the present invention is to construct a base 600 for containing the integrated circuitry 620 needed to drive the display and to distribute all pixel connections to the appropriate "major seam" locations. For example, with a cubical display, such as the cubical display of FIG. 3, the lower face of the cubical section 300, may act as the base of the display. The base 600 may be constructed from, for example, a glass material or silicon material that is etched and has appropriate circuitry deposited thereon.

The major seam is defined as the outermost edge of a cube section, designed to square off all sides of the section and provide distribution of connections from the base or other major seams. The major seam appropriately routes signals and connections to etched pixel connections, pixel seams, or other major seams. The major seam may also provide structural stability and weight distribution.

Figure 7:
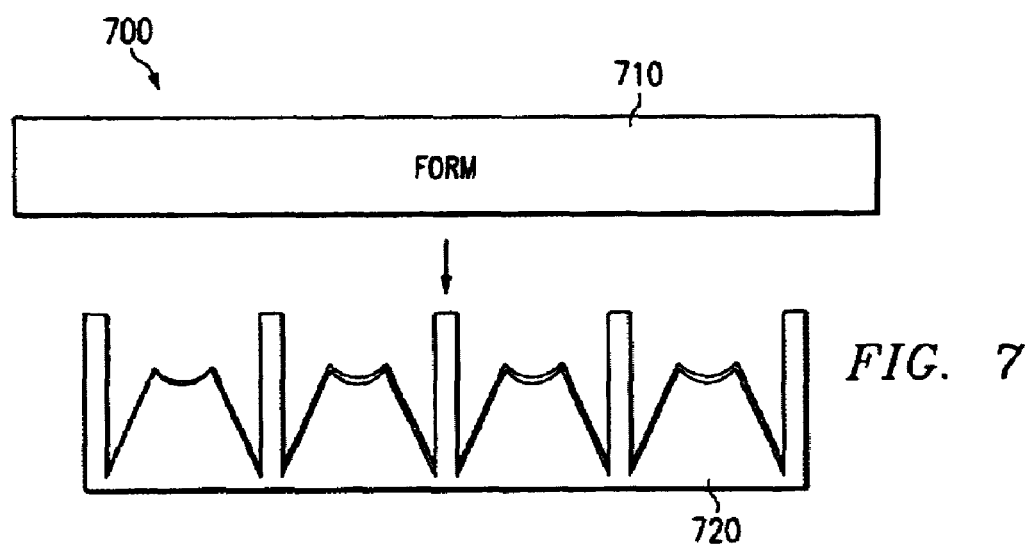

Next, a first "form layer" 700 is created when a form 710 is pressed to a mold 720 and a glass material, which is secreted into the mold 720, is thereby manipulated to a desired shape (FIG. 7). A "form layer" is defined as a layer of partial pixels formed by pressing a form onto a mold. The mold 720 may include electrical components, such as cathodes and anodes, which are to be embedded into the pliant glass as it is pressed into shape while other electrical connections, such as lead lines, may be kept exterior to the glass. The glass is allowed to solidify and the form is then removed.

The mold 720 is pitted with shapes necessary to create one half of a pixel (not including the base or lens). The mold may be pitted in such a way that a plurality of "half pixels" are created with each form layer.

After the glass has solidified, etching is performed to place fine wires, resistors, and the like on the "half pixels." Resistors are placed on the interior walls of the "half pixel" while wirings are placed on the pixel walls and the base 600. Connections to "major seams" are made along pixel seams. The first layer of wiring for a "major seam" will connect directly to the integrated circuitry of the base 610.

After etching the wiring patterns and placement of the electrical devices, a protective coating is applied to all exposed surfaces and allowed to set. The protective coating helps to prevent ultraviolet radiation from escaping the pixel cells by reflecting or absorbing them. Additionally, some of this protective material may be chemically included in the glass or similar material used to form the pixel structure, to further protect primary electrical components from ultraviolet radiation degradation.

Next, the red, green and blue phosphorus material is applied to the appropriate anode, cell wall, or portion of cell wall near the anode. The first form layer 700 is then immersed in a gas filled volume 810 (FIG. 8), such as a Xenon filled chamber, for example. The first form layer 700 is then applied and sealed to the base 610 using a sealing solution. The pixel faces are shaded in FIG. 8 for purposes of clarity only.

Figure 9:
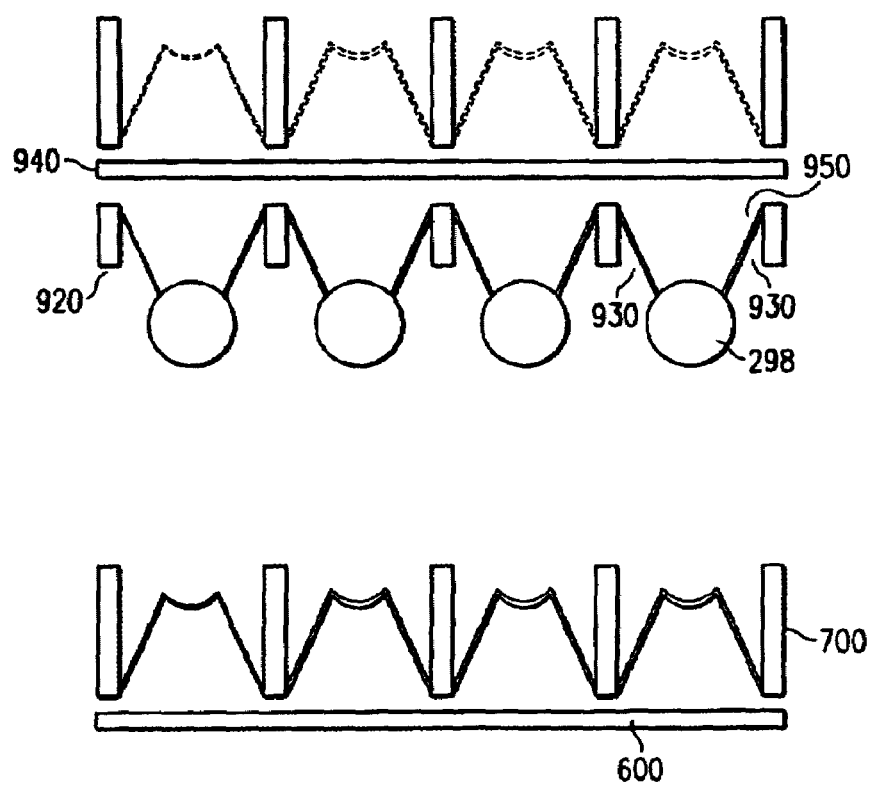

A sealing solution is applied, and a second form layer 920 is then applied to the first form layer 700 (FIG. 9). To aid in sealing the first form layer 700 to the base 610 and the second form layer 920 to the first form layer 700, layer connectors (not shown) may be utilized. Layer connectors are juts or small bumps of extra pixel material, such as glass, which are left during the form layer process so that the form layer may be more fully joined with the next form layer or base.

The second form layer 920 is created in the same manner as the first form layer 700 but includes the form corresponding to the other half of the pixels in the first form layer 700 (excluding the upper pixel face). The second form layer 920 may also include the lens 298.

The sealing solution seals the connection between the two form layers. The side-facing and bottom-facing cells 930 thereby seal in a portion of the gas from the gas filled volume. Next, a top glass plate 940 is applied to the second form layer 920 to thereby seal in a portion of the gas from the gas filled volume in the upper cell 950 of the pixels. Normally, however, an additional layer of pixels is placed above the first layer of pixels and may serve as its top plate 940.

After the pixels in a layer have been completed, external wiring and circuitry are added to the layer. This external wiring may include anode bus lines, cathode lines, and the like. Preferably, these electrical wirings and bus lines are positioned in the seams between pixels. The process may be repeated as required to complete additional layers of pixels.

Figure 10A:
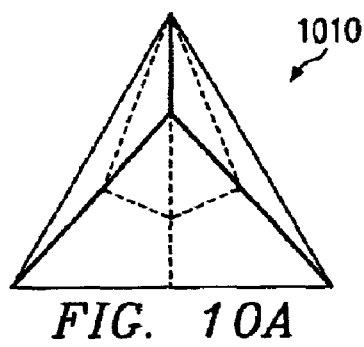
FIG. 10 is an exemplary diagram of an alternative embodiment of a pixel and a cell contained within the pixel according to the invention.
Figure 10B:
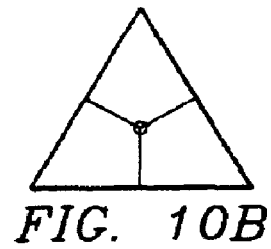
Figure 10C:
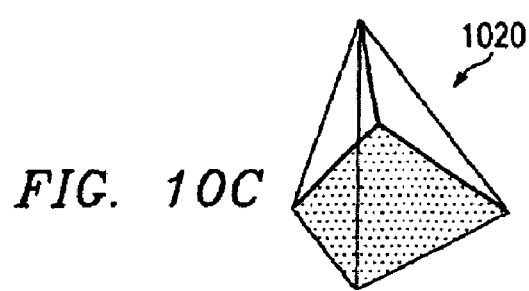
Figure 8:
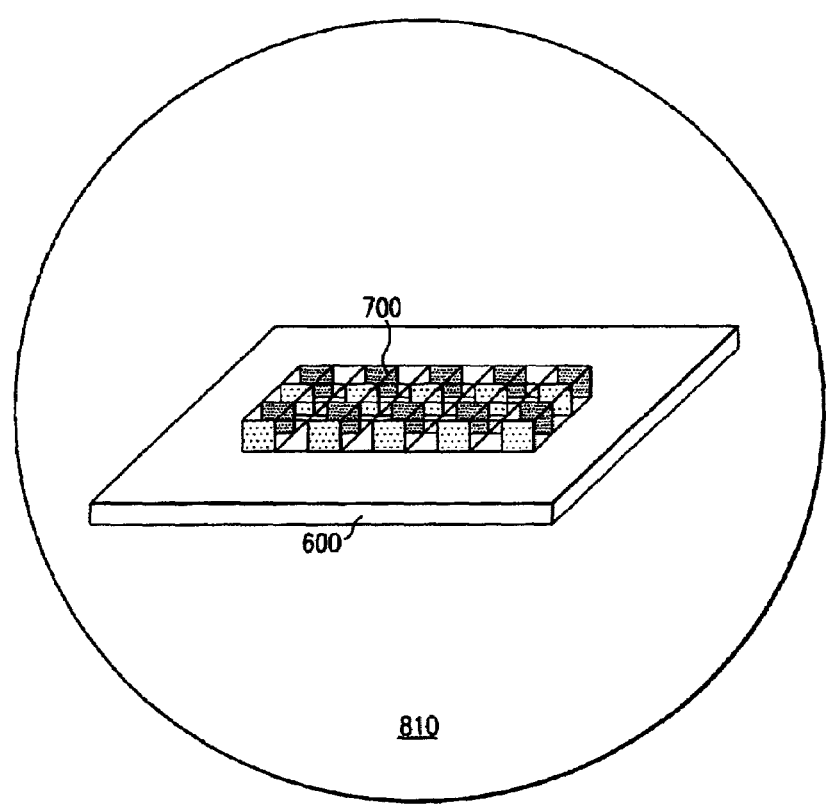

While the above description of the three-dimensional display of the invention makes reference to cubical cells and a cubical display, the invention is not limited to such embodiments. Rather, any shape of the cells and the display may be utilized without departing from the spirit and scope of the present invention. For example, as shown in FIGS. 10A–C, the pixel 1010 and the cells 1020 may be triangular in shape (FIG. 10B depicts the base of the pixel 1010). Furthermore, the display may make use of these triangular shapes to create a display having a plurality of geometries.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A three dimensional display, comprising:
    a three dimensional matrix of light emitting elements capable of generating images in three dimensions; and
    a base coupled to the three dimensional matrix, the base having electrical circuitry for powering and controlling the three dimensional matrix, wherein the light emitting elements are pixels, and wherein each of the pixels has a red light emitting element, a green light emitting element, and a blue light emitting element, and wherein the red light emitting element, green light emitting element and blue light emitting element each include a cell having an anode, a cathode, a gas volume and a phosphorus material.

2. The three dimensional display of claim 1, wherein the red light emitting element, green light emitting element, and blue light emitting element each have an anode and a cathode.

3. The three dimensional display of claim 1, wherein an anode of one of the pixels is shared by at least one other pixel.

4. The three dimensional display of claim 1, wherein a face of one of the pixels is shared by another pixel.

5. The three dimensional display of claim 1, wherein a top face of a pixel is the bottom face of a neighboring pixel, and wherein the side of the pixel is the side of another neighboring pixel.

6. The three dimensional display of claim 1, wherein electrical connections between the pixels, signal sources and power sources are positioned in seams between pixels.

7. The three dimensional display of claim 1, wherein an anode bus line is positioned in a seam from a first anode of a pixel to a second anode of another pixel.

8. The three dimensional display of claim 1, wherein a first anode of a first red light emitting element of a pixel is connected to a second anode of a second red light emitting element in another pixel by a straight line bus connection along a seam in any direction in the three dimensional matrix.

9. The three dimensional display of claim 1, wherein a first anode of a first green light emitting element of a pixel is connected to a second anode of a second green light emitting element in another pixel by a straight line bus connection along a seam in any direction in the three dimensional matrix.

10. The three dimensional display of claim 1, wherein a first anode of a first blue light emitting element of a pixel is connected to a second anode of a second blue light emitting element in another pixel by a straight line bus connection along a seam in any direction in the three dimensional matrix.

11. The three dimensional display of claim 1, wherein a first cathode of a first pixel is connected to a second cathode of a second pixel by a straight line connection along a seam in any direction in the three dimensional matrix.

12. The three dimensional display of claim 1, wherein the distance between two adjacent anodes is a square root of two multiplied by a length of one side of a pixel.

13. The three dimensional display of claim 8, wherein a distance between the first anode and the second anode of the first red light emitting element and the second red light emitting element is twice the length of one side of a pixel.

14. The three dimensional display of claim 9, wherein the distance between the first anode and the second anode of the first green light emitting element and the second green light emitting element is twice the length of one side of a pixel.

15. The three dimensional display of claim 10, wherein the distance between the first anode and the second anode of the first blue light emitting element and the second blue light emitting element is twice the length of one side of a pixel.

16. The three dimensional display of claim 11, wherein a distance between the first cathode and the second cathode of first pixel and the second pixel is twice the length of one side of a pixel.

17. The three dimensional display of claim 1, further comprising a control system that controls which of the light emitting elements in the three dimensional matrix are illuminated.

18. The three dimensional display of claim 17, wherein the control system controls color, intensity and duration of the light emitted by the light emitting elements in the three dimensional matrix.

19. The three dimensional display of claim 17, wherein the control system receives an input image coded in a three dimensional coordinate system.

20. The three dimensional display of claim 19, wherein the input image is received from one of a computer, television signal receiver, cable system receiver, satellite receiver, and a storage medium.

21. The three dimensional display of claim 19, wherein the control system pixelizes the input image for reproduction by the three dimensional display.

22. The three dimensional display of claim 1, wherein the three dimensional matrix has a cube shape.

23. A three dimensional display, comprising:
- a plurality of three dimensional light emitting elements configured into a three dimensional matrix of light emitting elements that emits light in three dimensions; and
- a controller that controls the operation of the light emitting elements to generate a three dimensional image, wherein the light emitting elements are pixels, and wherein each of the pixels has a red light emitting element, a green light emitting element, and a blue light emitting element, and wherein the red light emitting element, green light emitting element and blue light emitting element each include a cell having an anode, a cathode, a gas volume and a phosphorus material.

24. The three dimensional display of claim 23, wherein a cathode of one of the pixels is shared by one or more other pixels.

25. The three dimensional display of claim 23, wherein the red light emitting element, green light emitting element, and blue light emitting element each have an anode and a cathode.

26. The three dimensional display of claim 23, wherein an anode of one of the pixels is shared by one or more other pixels.

27. The three dimensional display of claim 23, wherein a face of one of the pixels is shared by another pixel.

28. The three dimensional display of claim 23, wherein a top face of a pixel is the bottom face of a neighboring pixel, and wherein the side of a pixel is the side of another neighboring pixel.

29. The three dimensional display of claim 23, wherein electrical connections between the pixels, signal sources and power sources are positioned in seams between pixels.

30. The three dimensional display of claim 23, wherein an anode bus line is positioned in a seam from an anode of a pixel to an anode of another pixel.

31. The three dimensional display of claim 23, wherein a cathode line is positioned in a seam from a cathode of one pixel to a cathode of another pixel.

32. The three dimensional display of claim 23, wherein an anode of a red light emitting element of a pixel is connected to another anode of a red light emitting element in another pixel by a straight line bus connection along a seam in any direction.

33. The three dimensional display of claim 23, wherein an anode of a green light emitting element of a pixel is connected to another anode of a green light emitting element in another pixel by a straight line bus connection along a seam in any direction.

34. The three dimensional display of claim 23, wherein an anode of a blue light emitting element of a pixel is connected to another anode of a blue light emitting element in another pixel by a straight line bus connection along a seam in any direction.

35. The three dimensional display of claim 23, wherein a first cathode of a first pixel is connected to a second cathode of a second pixel by a straight line connection along a seam in any direction.

36. The three dimensional display of claim 32, wherein the distance between the anodes of the red light emitting elements is twice the length of one side of a pixel.

37. The three dimensional display of claim 33, wherein the distance between the anodes of the green light emitting elements is twice the length of one side of a pixel.

38. The three dimensional display of claim 34, wherein the distance between the anodes of the blue light emitting elements is twice the length of one side of a pixel.

39. The three dimensional display of claim 35, wherein the distance between the first cathode and the second cathode is twice the length of one side of a pixel.

40. The three dimensional display of claim 23, wherein the distance between two adjacent anodes is the square root of two times the length of one side of a pixel.

41. The three dimensional display of claim 23, wherein the controller controls the color, intensity and duration of the light emitted by the light emitting elements.

42. The three dimensional display of claim 23, wherein the controller receives an input image that is coded in a three dimensional coordinate system.

43. The three dimensional display of claim 42, wherein the input image is received from one of a computer, television signal receiver, cable system receiver, satellite receiver, and a storage medium.

44. The three dimensional display of claim 42, wherein the control system pixelizes the input image for reproduction by the three dimensional display.

45. The three dimensional display of claim 23, wherein the light emitting elements are formed into a matrix having a cube shape.

* * * * *